(12) United States Patent
Zhuang et al.

(10) Patent No.: US 9,201,267 B2
(45) Date of Patent: Dec. 1, 2015

(54) OPTICAL FILM AND LIQUID CRYSTAL DISPLAY

(71) Applicants: Xiamen Tianma Micro-Electronics Co., Ltd., Fujian (CN); Tianma Micro-Electronics Co., Ltd., Shenzhen (CN)

(72) Inventors: Xiaoling Zhuang, Fujian (CN); Shichang Chen, Fujian (CN)

(73) Assignees: Xiamen Tianma Micro-Electronics Co., Ltd., Fujian (CN); Tianma Micro-Electronics Co., Ltd., Shenzhen (CN)

(*) Notice: Subject to any disclaimer, the term of this patent is extended or adjusted under 35 U.S.C. 154(b) by 70 days.

(21) Appl. No.: 14/091,108

(22) Filed: Nov. 26, 2013

(65) Prior Publication Data

US 2014/0375928 A1   Dec. 25, 2014

(30) Foreign Application Priority Data

Jun. 20, 2013  (CN) .......................... 2013 1 0247619

(51) Int. Cl.
| | | |
|---|---|---|
| *G02F 1/1335* | (2006.01) | |
| *G02B 27/10* | (2006.01) | |
| *G02B 5/04* | (2006.01) | |
| *G02B 5/30* | (2006.01) | |
| *G02B 27/28* | (2006.01) | |

(Continued)

(52) U.S. Cl.
CPC ........ *G02F 1/133606* (2013.01); *G02B 5/0247* (2013.01); *G02B 5/045* (2013.01); *G02B 5/3033* (2013.01); *G02B 5/3066* (2013.01); *G02B 6/00* (2013.01); *G02B 27/285* (2013.01); *G02B 27/286* (2013.01); *G02F 1/13362* (2013.01); *G02F 1/133526* (2013.01); *G02F 1/133615* (2013.01)

(58) Field of Classification Search
CPC .................... G02F 1/133615; G02F 1/133606; G02F 1/133604; G02F 2001/133607; G02F 2001/133616; G02B 6/0053; G02B 6/0038; G02B 5/045; G02B 6/0056
USPC .................................. 349/62, 63, 64; 359/625
See application file for complete search history.

(56) References Cited

U.S. PATENT DOCUMENTS 5,422,756 A      6/1995  Weber
RE38,305 E  *  11/2003  Gunjima et al. .................. 349/9

(Continued)

FOREIGN PATENT DOCUMENTS

| | | |
|---|---|---|
| CN | 1825181 A | 8/2006 |
| CN | 202735533 U | 2/2013 |
| EP | 1790905 A1 | 5/2007 |

OTHER PUBLICATIONS

Partial European Search Report for European Application No. 13194272,4, mailed on Nov. 6, 2014, 5 pages total.

(Continued)

*Primary Examiner* — Mike Qi
(74) *Attorney, Agent, or Firm* — Alston & Bird LLP

(57) ABSTRACT

An optical film includes a first optical layer and a second optical layer. The first optical layer is disposed above the second optical layer. The second optical layer is a composite material layer, which includes a base material and a doping layer disposed in the base material. The optical film recycles an exterior light source and improves the utilization rate of the light source.

19 Claims, 4 Drawing Sheets

(51) Int. Cl.
*G02B 5/02* (2006.01)
*G02B 6/00* (2006.01)

(56) References Cited

U.S. PATENT DOCUMENTS

2003/0095400 A1    5/2003  Kashima et al.
2003/0118750 A1*   6/2003  Bourdelais et al. ............ 428/1.3
2005/0001957 A1*   1/2005  Amimori et al. .............. 349/112
2007/0153162 A1    7/2007  Wright et al.
2008/0049317 A1*   2/2008  Hara et al. .................... 359/483
2010/0214762 A1    8/2010  Nevitt et al.
2014/0104689 A1*   4/2014  Padiyath et al. .............. 359/592

OTHER PUBLICATIONS

Extended European Search Report for European Application No. 13194272.4, mailed Mar. 18, 2015, 12 pages total.

* cited by examiner

OPTICAL FILM AND LIQUID CRYSTAL DISPLAY

CROSS-REFERENCES TO RELATED APPLICATIONS

The present application claims the benefit of priority to Chinese Patent Application No. 201310247619.8, entitled "OPTICAL FILM AND LIQUID CRYSTAL DISPLAY", filed with the Chinese Patent Office on Jun. 20, 2013, the content of which is incorporated herein by reference in its entirety.

FIELD OF THE INVENTION

The present invention relates to the liquid crystal display field, and in particular to an optical film and a liquid crystal display adopting the optical film.

BACKGROUND OF THE INVENTION

The light produced by a liquid crystal display backlight is natural light, which consists of P-polarized light and S-polarized light which are perpendicular to each other in the polarization direction. The natural light is generally coupled by a light guide plate and reaches a polarizer, however, usually less than half of the light energy emitted by the backlight passes through the liquid crystal display and at least half of the light energy is consumed because only the polarized light with the polarization direction parallel to the light-passing direction of the polarizer passes through the polarizer while the polarized light with the polarization direction perpendicular to the light-passing direction of the polarizer is totally absorbed and consumed. Therefore, the light emitted by the backlight cannot be fully utilized, and the utilization rate of the light is low.

BRIEF SUMMARY OF THE INVENTION

The present invention provides an optical film and a liquid crystal display including the optical film, which can avoid the above mentioned problems and the disadvantages in the prior art.

Embodiments of the present invention provide technical solutions addressing the problems related with prior art. One inventive aspect of the present invention is an optical film.

In an embodiment, the optical film includes a first optical layer and a second optical layer, the first optical layer being above the second optical layer. The second optical layer is a composite material layer, which includes a base material and a doping layer in the base material.

Another inventive aspect of the application is a liquid crystal display.

In an embodiment, the liquid crystal display includes a liquid crystal display panel, a backlight, and an optical film. The liquid crystal display panel is the outmost layer of the display. The optical film includes a first optical layer and a second optical layer, the first optical layer being above the second optical layer. The second optical layer is a composite material layer, which includes a base material and a doping layer in the base material.

DETAILED DESCRIPTION OF THE INVENTION

Figure 1:
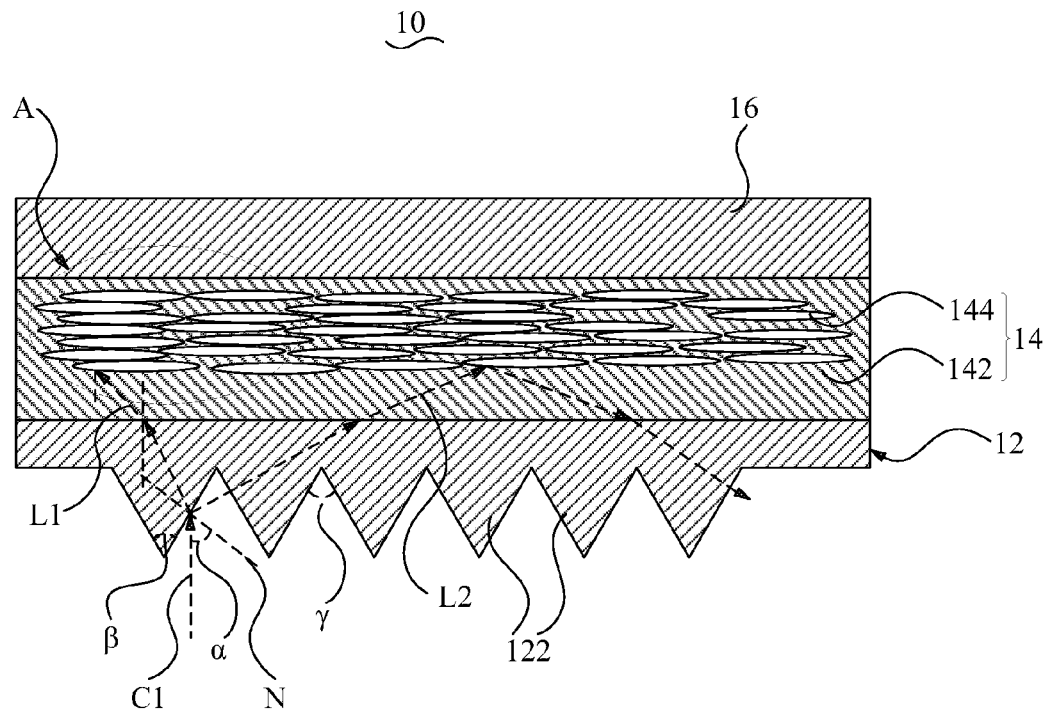
FIG. 1 is a sectional diagram of an optical film according to a first embodiment of the invention.
Figure 2:
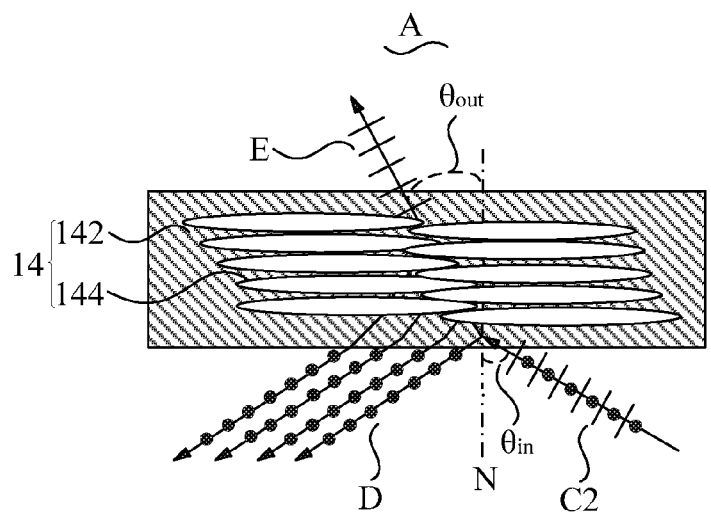
FIG. 2 is a schematic enlarged diagram of area A in FIG. 1.

FIG. 1 and FIG. 2 show an optical film 10 according to the first embodiment of the invention. The optical film 10 includes a first optical layer 12, a second optical layer 14 and a third optical layer 16.

As shown in FIG. 1, the first optical layer 12 is disposed at the bottom of the optical film 10. The first optical layer 12 is a prism sheet including a plurality of prisms 122. The apex angle (vertex) of each prism 122 is denoted as γ, which bulges outward from the outside of the optical film 10, i.e., the bulging direction is pointing away from the second optical layer 14. In the incident light $C_1$, there is a portion of incident light C1 in accordance with the light-passing direction of the optical film 10 that enters the optical film at a Brewster angle, with an angle of incidence α at the first optical layer 12. The angle of incidence α, which is an angle between the incident light $C_1$ and a normal N, is in a range of 52.2 degrees≤α<90 degrees. The apex angle (vertex) β of each prism 122 is set as: β=180°−2α. An angle γ formed between the intersecting sides of two adjacent prisms 122 is set equal to α, that is to say, α=γ. Another portion of the incident light $C_1$ which is perpendicular to the light-passing direction of the optical film 10 propagates forward along an optical path $L_2$, reaching the second optical layer 14 and is then reflected and outgoes from the optical film 10. The first optical film 12 is an organic thin film, e.g., Polyethylene terephthalate (PET) and Polycarbonate (PC). The refractive index $n_1$ of the first optical layer 12 ranges from 1.3 to 1.8.

The second optical layer 14 is disposed in the middle of the optical film 10. The second optical layer 14 is a composite material including a base material 142 and a doping layer 144. The doping layer 144 includes multiple layers constructed by bubbles. Each bubble is elongated and is filled with air, $CO_2$ or an inert gas. The refractive index $n_{20}$ of the bubble is smaller than the refractive index $n_1$ of the first optical layer 12 and the refractive index $n_2$ of the base material 142. Manufacturing processes of the second optical layer 14 may include, but are not restricted to stretching, coating, colloidal film and foaming. Taking the stretching process as an example, firstly the base material 142 is stretched, then an inert gas is filled in the base material 142 to generate bubbles in the base material 142. The multiple bubble layers, which are formed by the bubbles and fit closely to each other, fill in the base material 142. It can be understood that an optical effect caused by the bubble layers is equivalent to multiple glass layers that are arranged closely one above another. An emerging light, which finally outgoes from the optical film 10 (10a) by reflections and refractions through the multiple bubble layers, is a completely linearly polarized light if the angle of incidence at the optical film 10 is the Brewster angle according to the pile-of-plates polarization principle.

Similar to the first optical layer 12, the base material 142 of the second optical layer 14 is an organic thin film, such as Polyethylene terephthalate (PET) or Polycarbonate (PC). The refractive index $n_2$ of the base material 142 in the second optical layer ranges from 1.3 to 1.8.

$SiO_2$ particles may be disposed in the bubbles of the doping layer 144. The refractive index of $SiO_2$ is equal to or smaller than 1.2. Alternatively, a plurality of $SiO_2$ particles are adopted in the doping layer 144 to replace the bubble layer and fill in the base material 142 by coating of colloidal sol. It is not restricted to adopt the bubbles or the $SiO_2$ particles according to the Brewster principle. The effect of the Brewster polarization can be implemented as long as the refractive index $n_{20}$ is smaller than the refractive index $n_1$ of the first optical layer 12 and the refractive index $n_2$ of the base material 142 in the second optical layer.

FIG. 2 is a schematic enlarged diagram of area A in FIG. 1. When an incident light $C_2$ reaches the second optical layer 14, in the incident light $C_2$, a portion of which in accordance with the light-passing direction of the optical film 10 enters the doping layer 144 with an angle of incidence θin (here the optical path of the incident light $C_2$ is equivalent to the optical path $L_1$ in FIG. 1). Here the relationship among the angle of incidence θin, the refractive index $n_2$ of the base material 142 of the second optical layer and the refractive index $n_{20}$ of the doping layer 144 is given as:

$$\theta \text{ in} = \arctan\left(\frac{n_{20}}{n_2}\right),$$

and the relationship among an emergence angle θout, the refractive index $n_2$ of the base material 142 of the second optical layer and the refractive index $n_{20}$ of the doping layer 144 is given as:

$$\theta \text{ out} = \arctan\left(\frac{n_2}{n_{20}}\right).$$

Another portion of the incident light perpendicular to the light-passing direction of the optical film 10 is reflected by the doping layer 144 and outgoes from the optical film 10, and a reflection light D (equivalent to the optical path $L_2$ in FIG. 1) is generated.

The third optical layer 16 is disposed on the top surface of the optical film 10. The third optical layer is a polarizer, which has the same structure and function as conventional polarizers, is not restricted to the absorption-type polarizer, or the reflection-type polarizer, and the like. The refractive index $n_3$ of the third optical layer 16 ranges from 1.3 to 1.8 according to the first embodiment.

The whole thickness of the optical film 10 is equal to or greater than 0.03 mm according to an embodiment of the present invention.

Figure 3:
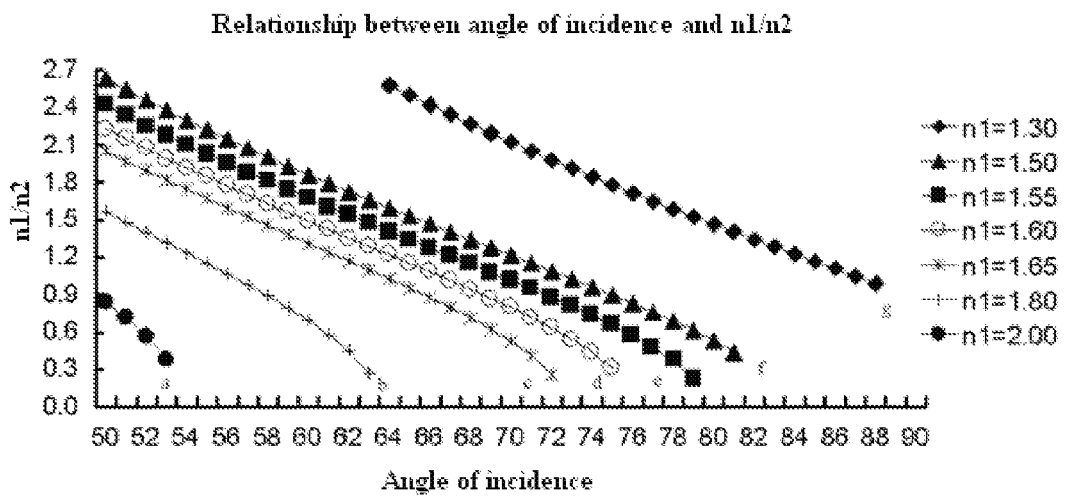
FIG. 3 is a graph, which shows curves representing the relation between an angle of incidence and a ratio of a refractive index of a first optical layer to a refractive index of a second optical layer according to the first embodiment of the invention.
Figure 4:
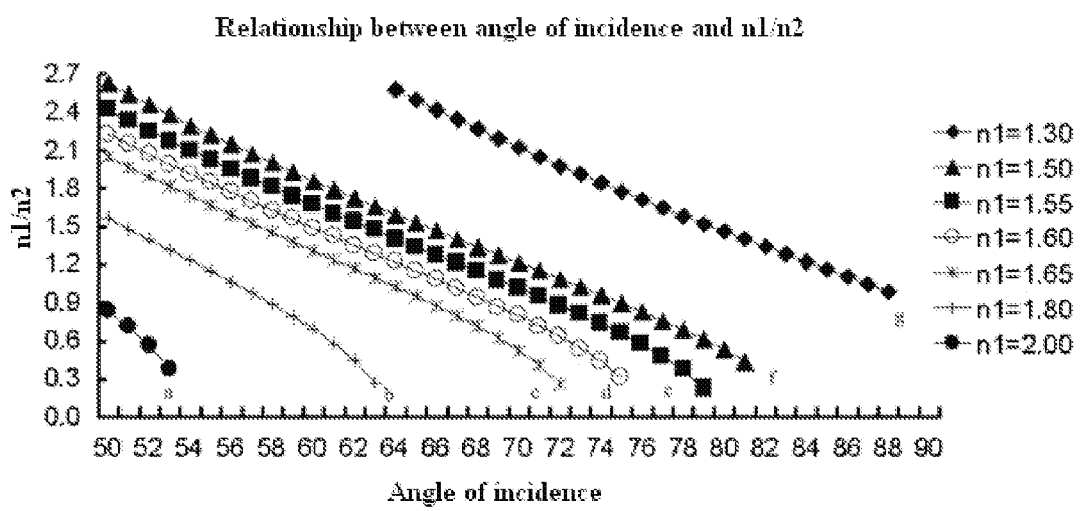
FIG. 4 is another graph, which shows curves representing the relation between the angle of incidence and a ratio of a refractive index of the first optical layer to a refractive index of the second optical layer according to the first embodiment of the invention.

FIG. 3 and FIG. 4 illustrate an ideal value of the angle of incidence α in the case where the refractive index $n_1$ of the first optical layer 12 and the refractive index $n_2$ of the base material 142 of the second optical layer are both in a range from 1.3 to 1.8. In order to ensure that the incident light enters the optical film 10 at the Brewster angle, the angle of incidence α, the refractive index $n_0$ of the air, the refractive index $n_1$ of the first optical layer, the refractive index $n_2$ of the second optical layer and the refractive index $n_{20}$ of the doping layer 144 satisfy the following formula:

$$\arcsin\left(\frac{n_1}{n_2}\sin\left(\alpha - \arcsin\left(\frac{n_0}{n_1}\sin\alpha\right)\right)\right) = \arctan\left(\frac{n_{20}}{n_2}\right).$$

As shown in FIG. 3, the seven curves a, b, c, d, e, f and g represent respectively the changes of the angle of incidence α and the ratio of $n_1/n_2$ as $n_1$ changes. In order to satisfy the formula $$\arcsin\left(\frac{n_1}{n_2}\sin\left(\alpha - \arcsin\left(\frac{n_0}{n_1}\sin\alpha\right)\right)\right) = \arctan\left(\frac{n_{20}}{n_2}\right),$$

the angle of incidence α increases correspondingly as $n_1/n_2$ decreases ($n_2$ increases) in the case where $n_1$ is a constant, $n_1/n_2$ decreases as $n_1$ increases in the case where the angle of incidence α is a constant, or the angle of incidence α increases as $n_1$ decreases in the case where $n_1/n_2$ is a constant.

As shown in FIG. 4, the refractive index $n_1$ of the first optical layer 12 and the refractive index $n_2$ of the second optical layer 14 are usually equal to or larger than 1.0 and the range of the refractive index of known materials suitable for the optical layers ranges from 1.3 to 1.8, the value of $n_1/n_2$ ranges from 0.72 to 1.38 consequently. The formula $$\arcsin\left(\frac{n_1}{n_2}\sin\left(\alpha - \arcsin\left(\frac{n_0}{n_1}\sin\alpha\right)\right)\right) = \arctan\left(\frac{n_{20}}{n_2}\right)$$

is satisfied in shadow regions of FIG. 4 in the case where the refractive index $n_1$ of the first optical layer and the refractive index $n_2$ of the second optical layer range from 1.3 to 1.8, and in this case the minimum value of the angle of incidence α is 52.2 degree, $n_1=1.80$, and $n_1/n_2=1.38$.

Figure 5:
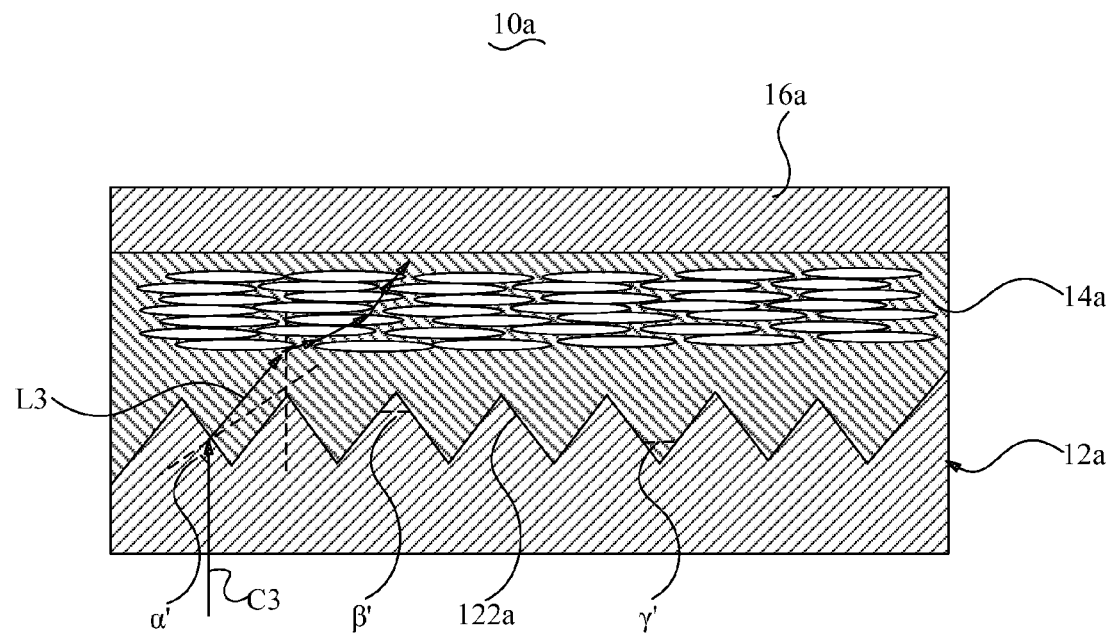
FIG. 5 is a sectional diagram of an optical film according to a second embodiment of the invention.

FIG. 5 illustrates an optical film 10a according to a second embodiment of the invention. The optical film 10a includes a first optical layer 12a, a second optical layer 14a and a third optical layer 16a.

The first optical layer 12a is disposed at the bottom of the optical film 10a. The first optical layer 12a is a prism sheet including a plurality of prisms 122a. The apex angle (vertex) of each prism 122a is denoted as β', which faces the inner side of the optical film 10a, that is to say, faces the second optical layer 14a. Each prism 122a of the first optical layer 12a fits the second optical layer 14a. The relationships among an angle of incidence α', the point angle β' of the prism 122a and an angle γ' between the bottoms of two adjacent prisms 122a are given as: β'=180°−2α', α'=γ' as a light $C_3$ reaches the optical film 10a.

The relationship of the angle of incidence α', the refractive index $n_1'$ of the first optical layer 12a, the refractive index $n_2'$ of the base material 142a of the second optical layer and a refractive index $n_{20}'$ of the doping layer 144a of the second optical layer is given as:

$$\arcsin\left(\frac{n_2'}{n_1'}\sin\alpha'\right) - \alpha' = \arcsin\left(\frac{n_{20}'}{n_2'}\right)$$

in the case where the refractive index $n_1'$ of the first optical layer 12a is greater than the refractive index $n_2'$ of the base material 142a in the second optical layer and the light $C_3$ reaches the second optical layer 14a through the first optical layer 12a.

The relationship of the angle of incidence α', the refractive index $n_1'$ of the first optical layer 12a, the refractive index $n_2'$ of the second optical layer base material 142a and the refractive index $n_{20}'$ of the doping layer 144a of the second optical layer is:

$$\alpha' - \arcsin\left(\frac{n_2'}{n_1'}\sin\alpha'\right) = \arcsin\left(\frac{n_{20}'}{n_2'}\right)$$

in the case where the refractive index $n_1'$ of the first optical layer 12a is smaller than the refractive index $n_2'$ of the base material 142a of the second optical layer and the light $C_3$ reaches the second optical layer 14a through the first optical layer 12a.

The materials and the refractive indexes of the first optical layer 12a, the second optical layer 14a and the third optical layer 16a are the same as the corresponding optical layers in the first embodiment, hence they are not described here.

The working principle in the second embodiment of the invention is the same as that of the optical film 10 according to the first embodiment. After the light $C_3$ reaches the optical film 10a, polarized light in the light $C_3$ in accordance with the light-passing direction of the optical film 10a outgoes from the optical film 10a along the optical path $L_3$, and polarized light in the light C3 perpendicular to the light-passing direction of the optical film 10a is reflected outward by the second optical layer 14a of the optical film 10a (the reflection optical path is not shown in FIG. 5).

In the optical film 10 (10a) illustrated in embodiments of the present invention, the first optical layer 12 (12a), the second optical layer 14 (14a) and the third optical layer 16 (16a) are laminated as an integrity. Alternatively, the optical film 10 (10a) may be arranged with a separable structure, e.g. the first optical layer 12 (12a) is laminated with the second optical layer 14 (14a), and the third optical layer 16 (16a) is separated from the optical film 10 (10a); or the three optical layers are respectively separated from each other.

The optical film 10 (10a) according to the first or second embodiment of the invention includes three optical layers. The doping layer 144 (144a) in the second optical layer 14 (14a) comprises multiple bubble layers. The emerging light outgoes from the optical film 10 (10a) is a completely linearly polarized light by the reflections and refractions through the multiple bubble layers if the light enters the optical film 10 (10a) at the Brewster angle.

Figure 6:
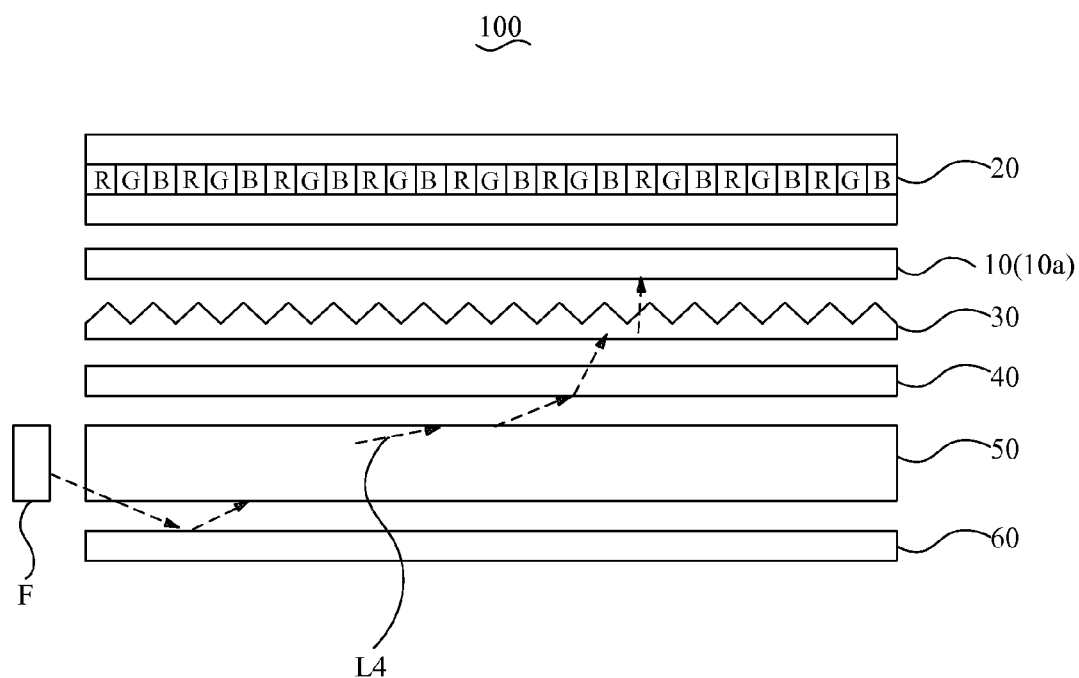
FIG. 6 is a schematic exploded diagram of a liquid crystal display according to embodiments of the invention.

Embodiments of the present invention also provide a liquid crystal display 100 including the optical film 10 (10a). FIG. 6 is a schematic exploded diagram of the liquid crystal display 100. The liquid crystal display 100 includes an optical film 10 (10a), a liquid crystal display panel 20 and a backlight.

The liquid crystal display panel 20 is the outmost layer of the display 100. The optical film 10 (10a) is disposed between the liquid crystal display panel 20 and the backlight. The backlight includes a prism sheet 30, a diffusion sheet 40, a light guide plate 50 and a reflective sheet 60 arranged under the optical film 10 (10a) in sequence, and a light source F.

The reflective sheet 60 is adapted to reflect light emitted from the light source F and the light guide plate 50, hence, the light source F is fully utilized. A micro-structure (not shown in FIG. 6) is provided on the light guide plate 50. The micro-structure is adapted to convert a point light source and a line light source emitted from the light source F into an area light source. The diffusion sheet 40 can diffuse the light and enhance the light distribution uniformity, thus grid points or defects possibly existed on the LCD panel 20 can be shielded. The optical film 10 (10a) is adapted to straighten the light emerging from the backlight, so an optical path $L_4$ is gathered and gained axially, thus the brightness of the liquid crystal display 100 is enhanced.

Figure 7:
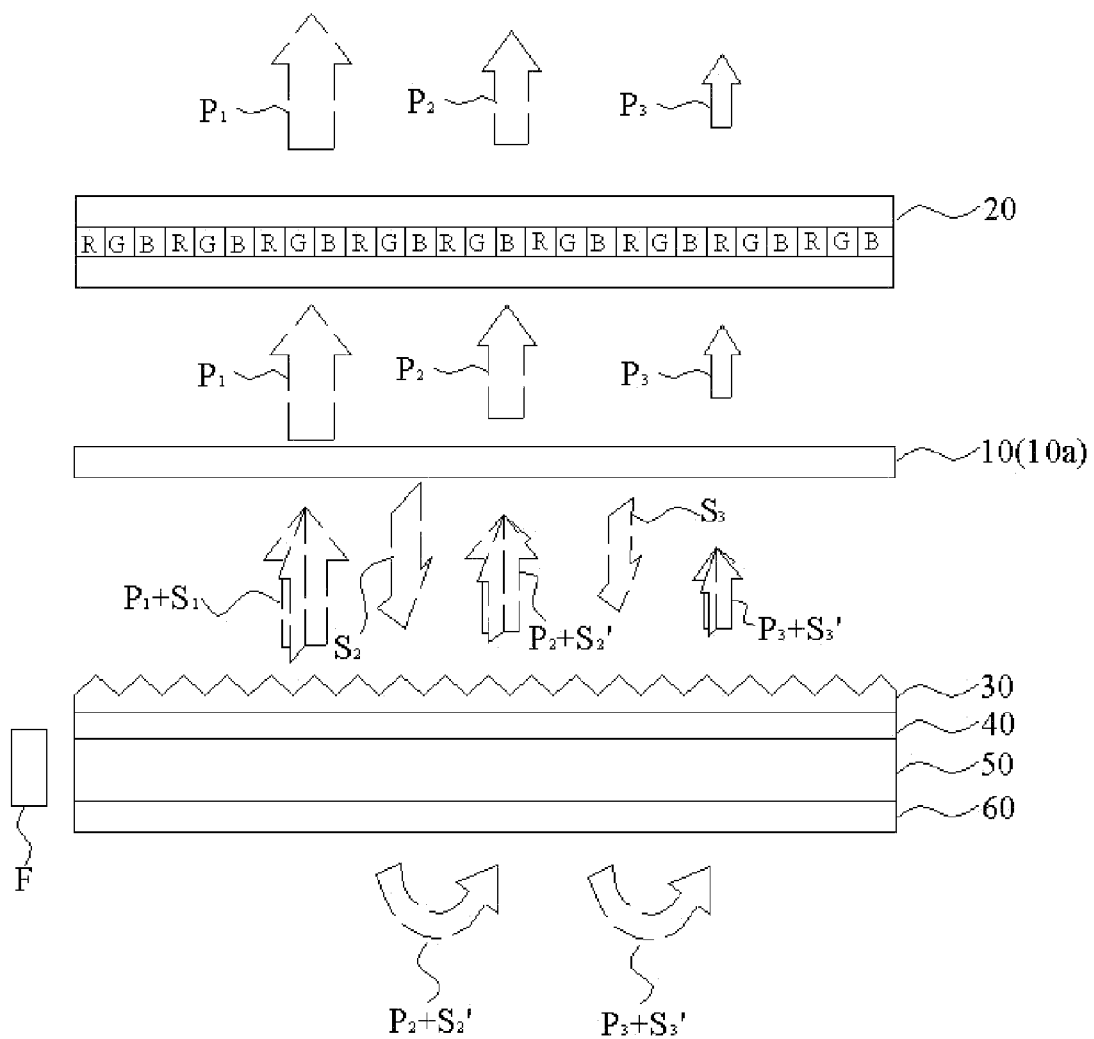
FIG. 7 is a schematic diagram showing that a light resource is utilized in the liquid crystal display according to embodiments of the invention.

FIG. 7 is a schematic diagram showing that the light resource F is fully utilized in the liquid crystal display 100 according to the present invention. The light source F is divided into two kinds of polarized light, $P_1$ and $S_1$, which are perpendicular to each other. The polarized light $P_1$ is in accordance with the light-passing direction of the optical film 10 (10a), so the polarized light $P_1$ is able to pass through the optical film 10 (10a). The polarized light $S_1$ is reflected by the optical film 10 (10a) and then a polarized light $S_2$ is generated. $S_2$ is diffused by the various layers of the backlight (the prism sheet 30, the diffusion sheet 40, the light guide plate 50 and the reflective sheet 60) and converted into natural light, which combines with the light source produced by the light source F to form the polarized light $P_2$ and $S_2'$. The polarized light $P_2$ enters and passes through the optical film 10 (10a) and finally emerges from the liquid crystal display panel 10. Since the polarized light $S_2'$ is not in accordance with the light-passing direction of the optical film 10 (10a), it is reflected out of the optical film 10 (10a) and converted into a polarized light $S_3$. $S_3$ is diffused by the various layers of the backlight (the prism sheet 30, the diffusion sheet 40, the light guide plate 50 and the reflective sheet 60) and converted into natural light, which combines with the light source produced by the light source F to form the polarization light $P_3$ and $S_3'$. The polarized light $P_3$ passes through the optical film 10 (10a) and finally outgoes from the liquid crystal display panel 10. Light penetration is implemented repeatedly by recycling the light emitted from the light source F, hence the light source F is fully used and the overall brightness of the liquid crystal display 100 is enhanced.

The optical film 10 (10a) is disposed between the liquid crystal display panel 10 and the backlight in the liquid crystal display 100 according to embodiments of the present invention. Therefore, after the light (natural light) emitted from the light source F reaches the optical film 10 (10a), the light parallel to the light-passing direction of the optical film 10 (10a) enters the optical film 10 (10a) at the Brewster angle, outgoes from the liquid crystal display panel 10 through multiple refraction of the second optical layer 14 (14a); while the light perpendicular to the light-passing direction of the optical film 10 (10a) is reflected by the second optical layer 14 (14a) for a plurality of times and converted into natural light by the diffusion of each layer of the backlight (the prism sheet 30, the diffusion sheet 40, the light guide plate 50 and the reflective sheet 60), which combines with the light produced by the light source F to reach the optical film 10 (10a). In such a recycle, the light emitted from the backlight is straightened by the optical film 10 (10a), the optical path is gathered and gained axially, thus the utilization rate of the light source F is improved and the brightness of the liquid crystal display 100 is enhanced.

Obviously, various changes and modifications can be made to embodiments of the present invention by those skilled in the art without departing from the spirit and scope of the invention. Hence, the invention also intends to include those changes and modifications.

What is claimed is:

1. An optical film, comprising a first optical layer and a second optical layer, wherein the first optical layer is disposed under the second optical layer and comprises a prism bulging away from the second optical layer;

the second optical layer is a composite material layer comprising a base material and a doping layer in the base material.

2. The optical film according to claim 1, wherein the doping layer comprises at least one elongated bubble.

3. The optical film according to claim 2, wherein the doping layer comprises a plurality of layers formed by the at least one elongated bubble.

4. The optical film according to claim 2, wherein the bubble comprises air or $CO_2$.

5. The optical film according to claim 2, wherein the bubble further comprises $SiO_2$ particles.

6. The optical film according to claim 1, wherein the doping layer comprises at least one particle having a refractive index that is smaller than a refractive index of the first optical layer and a refractive index of the base material in the second optical layer.

7. The optical film according to claim 6, wherein the doping layer comprises a plurality of layers formed by the at least one particle.

8. The optical film according to claim 7, wherein the particle is an $SiO_2$ particle.

9. The optical film according to claim 1, wherein the first optical layer is a prism sheet comprising a plurality of prisms, and apex angles (vertices) of the plurality of prisms bulge outward from the outside of the optical film.

10. The optical film according to claim 9, wherein the optical film further comprises a third optical layer, third optical layer being a polarizer and disposed on the top surface of the second optical layer.

11. The optical film according to claim 10, wherein the first optical layer, the base material of the second optical layer, and the third optical layer each have a refractive index in a range from 1.3 to 1.8.

12. The optical film according to claim 9, wherein an angle of incidence α at an apex angle (vertex) of each of the plurality of prisms is in a range of 52.2 degrees≤α<90 degrees, and an apex angle (vertex) β satisfies the relation β=180°−2α.

13. The optical film according to claim 12, wherein an angle γ formed between intersecting sides of two adjacent prisms of the first optical layer is equal to the angle of incidence α.

14. The optical film according to claim 1, wherein the first optical layer is a prism sheet comprising a plurality of prisms, and apex angles (vertices) of the prisms face an inner side of the optical film.

15. The optical film according to claim 14, wherein the optical film further comprises a third optical layer, is the third optical layer being a polarizer and disposed on the top surface of the second optical layer.

16. The optical film according to claim 15, wherein the first optical layer, the base material of the second optical layer, and the third optical layer each have a refractive index in a range from 1.3 to 1.8.

17. The optical film according to claim 16, wherein the doping layer in the second optical layer has a refractive index equal to or smaller than 1.2.

18. The optical film according to claim 17, wherein the optical film has a thickness equal to or greater than 0.03 mm.

19. A liquid crystal display, comprising a liquid crystal display panel, a backlight, and the optical film, the liquid crystal display panel being the outmost layer of the liquid crystal display, and the optical film being provided between the liquid crystal display panel and the backlight, the optical film comprising a first optical layer and a second optical layer, wherein the first optical layer is disposed under the second optical layer and comprises a prism bulging away from the second optical layer, the second optical layer is a composite material layer comprising a base material and a doping layer in the base material.

\* \* \* \* \*